US012416499B1

(12) United States Patent
Pelliccione et al.

(10) Patent No.: US 12,416,499 B1
(45) Date of Patent: Sep. 16, 2025

(54) REAL-TIME ADAPTIVE TUNING OF GYROSCOPES VIA QUADRATURE DITHERING

(71) Applicant: HRL Laboratories, LLC, Malibu, CA (US)

(72) Inventors: Matthew Pelliccione, Malibu, CA (US); Logan D. Sorenson, Malibu, CA (US); David Chang, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 374 days.

(21) Appl. No.: 18/146,933

(22) Filed: Dec. 27, 2022

(51) Int. Cl.
G01C 25/00 (2006.01)
G01C 19/5776 (2012.01)

(52) U.S. Cl.
CPC ....... *G01C 19/5776* (2013.01); *G01C 25/005* (2013.01)

(58) Field of Classification Search
CPC .......................... G01C 19/5776; G01C 25/005
See application file for complete search history.

(56) References Cited

U.S. PATENT DOCUMENTS

| 6,253,612 | B1 * | 7/2001 | Lemkin | G01C 19/56 73/504.02 |
|---|---|---|---|---|
| 6,725,719 | B2 | 4/2004 | Cardarelli | |
| 8,548,766 | B2 | 10/2013 | Judd | |
| 9,212,908 | B2 | 12/2015 | Geen | |
| 10,309,782 | B2 * | 6/2019 | Kapusta | G01C 19/5776 |
| 10,444,014 | B1 * | 10/2019 | Sorenson | G01C 19/5755 |
| 10,571,267 | B1 | 2/2020 | Sorenson et al. | |
| 11,835,339 | B1 * | 12/2023 | Sorenson | G01C 19/5776 |
| 2010/0294039 | A1 * | 11/2010 | Geen | G01C 19/5776 73/504.12 |
| 2012/0192648 | A1 * | 8/2012 | Geen | G01C 19/5776 73/504.12 |
| 2013/0125614 | A1 * | 5/2013 | Casinovi | G01C 19/5776 73/1.77 |

(Continued)

OTHER PUBLICATIONS

D. Lynch, "Coriolis Vibratory Gyros," in Proc. of Symposium Gyro Technology, Stuttgart, Germany, 1998, p. 1.0-1.14. (Reproduced as Annex B, Coriolis Vibratory Gyros, pp. 56-66 of IEEE Std. 1431-2004. IEEE Standard Specification Format Guide and Test Procedure of Coriolis Vibratory Gyros, IEEE Aerospace and Electronic Systems Society, Dec. 20, 2004).

*Primary Examiner* — David J Bolduc
(74) *Attorney, Agent, or Firm* — Ladas & Parry, LLP

(57) ABSTRACT

A CVG having an axisymmetric resonator with first and second degenerate vibratory modes, having respectively first and second mode resonance frequencies ($\omega 1$, $\omega 2$) wherein said first and second mode resonance frequencies differ by a frequency difference ($\Delta\omega$); a plurality of electrodes arranged at a distance around a periphery of the resonator; said plurality of electrodes comprising at least one resonance frequency tuning electrode arranged for, upon application of a first bias voltage signal to said at least one resonance frequency tuning electrode, acting on the frequency difference ($\Delta\omega$) by changing at least one of the first and second mode resonance frequencies; and a resonance frequency loop circuit arranged to generate said first bias voltage signal and regulate a value of said first bias voltage signal to maintain said frequency difference ($\Delta\omega$) at a predetermined minimal value.

20 Claims, 9 Drawing Sheets

(56) References Cited

U.S. PATENT DOCUMENTS

| | | | | |
|---|---|---|---|---|
| 2014/0102195 | A1* | 4/2014 | Geen | G01C 19/56 |
| | | | | 73/514.02 |
| 2015/0354959 | A1* | 12/2015 | Senkal | G01C 19/5684 |
| | | | | 73/504.13 |
| 2016/0298965 | A1* | 10/2016 | Kapusta | G01C 19/5712 |
| 2017/0023364 | A1* | 1/2017 | Gregory | G01P 21/00 |
| 2018/0245946 | A1* | 8/2018 | Weinberg | G01C 19/5684 |
| 2018/0274921 | A1* | 9/2018 | Matsukawa | G01C 19/5776 |
| 2019/0020308 | A1* | 1/2019 | Collin | G01N 29/346 |
| 2019/0360808 | A1* | 11/2019 | Seshia | G01C 19/5684 |
| 2020/0088518 | A1 | 3/2020 | Endean | |
| 2020/0309525 | A1* | 10/2020 | Lipka | G01C 19/5698 |
| 2020/0309563 | A1* | 10/2020 | Lipka | G01C 19/5698 |
| 2021/0010810 | A1* | 1/2021 | Sabater | H03L 7/08 |
| 2021/0270608 | A1* | 9/2021 | Zhou | G01C 25/005 |
| 2021/0284527 | A1* | 9/2021 | Endean | B81B 7/0016 |
| 2024/0191995 | A1* | 6/2024 | Sabater | G05D 23/24 |

* cited by examiner

100

GENERATING AND REGULATING A FIRST DC VOLTAGE INPUT OF FIRST LOOP THAT ACTS ON AT LEAST ONE OF THE FIRST AND SECOND MODE RESONANCE FREQUENCIES OF THE RESOATOR TO MAINTAIN A MINIMAL FREQUENCY DIFFERENCE BETWEEN THE RESONANCE FREQUENCIES OF FIRST AND SECOND VIBRATORY MODES.

SET FIRST DC VOLTAGE — 102

104 ADD A PREDETERMINED DITHER TO A SECOND DC VOLTAGE INPUT OF A SECOND LOOP THAT MAINTAINS A MINIMAL COUPLING BETWEEN THE FIRST AND SECOND VIBRATORY MODES IN RESPOSE TO AT LEAST ONE MOTION AMPLITUDE SIGNAL ALONG AT LEAST ONE OF THE FIRST AND SECOND VIBRATORY MODES

108 — RESPONSE MATCHES EXPECTED VALUE

106 COMPARE RESPONSE TO ADDED DITHER IN LEAST ONE MOTION AMPLITUDE SIGNAL TO EXPECTED MINIMAL VALUE

RESPONSE DOES NOT MATCH EXPECTED VALUE — 110

112 CHANGE THE FIRST DC VOLTAGE INPUT

FIG. 8

REAL-TIME ADAPTIVE TUNING OF GYROSCOPES VIA QUADRATURE DITHERING

CROSS REFERENCE TO RELATED APPLICATIONS

NA

STATEMENT REGARDING FEDERAL FUNDING

NA

TECHNICAL FIELD

This presentation relates to Coriolis vibratory gyroscopes.

BACKGROUND

Coriolis vibratory gyroscope (CVG) comprise a resonant structure, or resonator, that exhibits a degeneracy in its modal structure and comprises at least two modes of resonance. Ideally, the two modes have identical resonance frequencies and are orthogonal/uncoupled. Preferably, the two modes are of the second order or above. The CVG is arranged such that Coriolis force applied to the CVG couples energy from a first mode, along which the resonator is made to resonate, to the other mode when a rotation rate is applied with respect to an axis of the resonator. The rate at which energy is transferred to this second mode is a measure of the rotation rate about the axis of the resonator. CVGs are particularly suitable for being manufactured as MEMs and are thus desirable in a number of apparatuses, such as environmentally robust, high-performance inertial sensors with attractive CSWaP (Cost Size Weight and Power), for example in weapon systems or vehicle navigational and/or location systems.

In practice, it is difficult to manufacture CVG resonators having perfectly uncoupled modes of identical resonance frequencies. It is known to mechanically tune the resonator via removal of matter to improve the uncoupling of its modes and to match the resonance frequencies of its modes. However, mechanical tuning is expensive. It is also known to use electrostatic tuning of the resonator to improve the uncoupling of its modes and to match the resonance frequencies of its modes. Known electrostatic tuning comprises maintaining one or more electrodes on the periphery of the resonator at bias voltages which generate electrostatic fields that correct the deficiencies of the resonator, by either constantly pulling or pushing on the periphery of the resonator. It is known to maintain the modes uncoupled, by applying a bias voltage on at least one bias electrodes that can be called the BX electrode, which depends on a known quadrature control signal generated in a quadrature feedback/control loop provided to restrain the quadrature motion in the resonator. It is also known to maintain the resonance frequencies of the two modes as close as possible by determining, at a calibration step, a DC bias to be applied on at least one bias electrodes that can be called the BT electrode.

However, the Inventors have noted that a DC bias determined at calibration to maintain the resonance frequencies of the two modes as close as possible (e.g., identical) can become obsolete if the operating conditions of the CVG change after calibration. For example, if the CVG is calibrated with its resonator horizontal, the bias voltage chosen at calibration for maintaining the resonance frequencies identical may no longer do so if the CVG is moved such that the resonator is tilted or even vertical. Vibration or stress on the CVG, or changes in operating temperature or any drift in the control electronics generating the tuning voltages, or aging of the resonator, may also contribute to make the calibration bias voltage obsolete.

There exists a need for a scheme that would allow to actively maintain the resonance frequencies of the two modes as close as possible.

Embodiments of this presentation answer at least such a need.

SUMMARY

Embodiments of this presentation provide for a CVG with a loop arranged to generate and regulate a bias voltage that electrostatically maintains a difference $\Delta\omega$ between the resonance frequencies of the modes of a CVG under a predetermined value $\Delta\omega_0$, as well as a method of operating such a CVG. The loop can, starting with a calibration bias DC voltage (applied to resonance frequency tuning electrodes of the CVG) that sets $\Delta\omega$ under $\Delta\omega_0$: a/ add a dither signal to a second loop which maintains a minimal coupling between the first and second modes (by applying a DC voltage to mode coupling electrodes of the CVG); b/compare the response in the second loop to the added dither with an expected response to determine if $\Delta\omega$ remains below $\Delta\omega_0$; and c/ if the response in the second loop to the added dither shows that $\Delta\omega$ is no more below $\Delta\omega_0$, change the DC voltage on the resonance frequency tuning electrodes until $\Delta\omega$ goes back below $\Delta\omega_0$. This can be done by: a/ successively providing a predetermined series of probe DC voltages on the resonance frequency tuning electrodes (with the dither still added to the mode coupling electrodes); b/ memorizing the response in the second loop to the added dither for each probe DC voltage; and c/ selecting as the new DC voltage to be applied to the resonance frequency tuning electrodes the probe DC voltage that incurs the smallest response in the second loop to the added dither.

Embodiments of this presentation comprise a CVG where a gyroscope frequency tuning mismatch is actively measured and used to correct for sensor errors. The tuning mismatch can be used to correct in real-time the device using electrostatic tuning forces. The tuning mismatch can be measured by applying a dither signal to the quadrature tuning control DC bias, and verifying that the resonator responds to the dither as would be expected if there were no tuning mismatch. The tuning correction can be applied symmetrically across the gyroscope using multiple tuning electrodes.

A method according to embodiments of this presentation provides for actively measuring in real-time if the resonator is at an optimal tuned point ($\Delta\omega<=\Delta\omega_0$) in its operation, in parallel with existing gyro controls of the prior art. The method ensures that the resonator is always operating at its peak performance/optimal tuning point and helps compensate for bias changes due to the resonator moving away from the operating conditions in which it was set to its optimal tuning point. The tuning is maintained by applying an oscillation/dither to a quadrature control voltage and monitoring a response to the dither in the known rate signal. At the optimal tuning point, a first derivative of the rate signal with respect to the quadrature control voltage is zero, resulting in minimal visibility of the dither in the rate signal response. If the resonator moves away from tune, the applied dither amplitude and phase will change when measuring the rate signal output. A control loop can then be established that adjusts the electrostatic tuning voltages to move the sensor back to the tuned point.

Embodiments of this presentation comprise a Coriolis vibratory gyroscope having: an axisymmetric resonator with at least a first and a second n=2 degenerate vibratory modes, having respectively first and second mode resonance frequencies ($\omega 1$, $\omega 2$) wherein said first and second mode resonance frequencies differ by a frequency difference ($\Delta \omega$); a plurality of electrodes arranged at a distance around a periphery of the resonator; said plurality of electrodes comprising at least one resonance frequency tuning electrode (BT1, BT2) arranged for, upon application of a first bias voltage signal to said at least one resonance frequency tuning electrode (BT1, BT2), acting on the frequency difference ($\Delta \omega$) by changing at least one of the first and second mode resonance frequencies; and a resonance frequency loop circuit arranged to generate said first bias voltage signal and regulate a value of said first bias voltage signal to maintain said frequency difference ($\Delta \omega$) at a predetermined minimal value.

According to embodiments of this presentation, said predetermined minimal value of said frequency difference ($\Delta \omega$) is zero.

According to embodiments of this presentation, said plurality of electrodes further comprise: at least one mode coupling electrode (BX1, BX2) arranged for acting on a coupling between the first and second vibratory modes by application of a second bias voltage signal to said at least one mode coupling electrode (BX1, BX2); and at least one first sense electrode (S1) and at least one second sense electrode (S2) arranged to respectively sense a motion of the resonator along the first and second vibratory modes; the Coriolis vibratory gyroscope further comprising a quadrature control loop arranged between the at least one second sense electrode (S2) and the at least one mode coupling electrode (BX1, BX2) to generate said second bias voltage signal and regulate a value of said second bias voltage signal to maintain said coupling between the first and second vibratory modes at a minimal coupling value; wherein said resonance frequency loop circuit is arranged to generate said first bias voltage signal and regulate a value of said first bias voltage signal to maintain said frequency difference ($\Delta \omega$) at a predetermined minimal value by: adding a predetermined dither signal to said second bias voltage signal applied to said at least one mode coupling electrode (BX1, BX2); comparing at least one of an amplitude and a phase of a response to said dither signal on the at least one first sense electrode (S1) to a first predetermined response value; in case said at least one of an amplitude and a phase of a response to said dither signal on the at least one first sense electrode (S1) differs from said first predetermined response value, varying the first bias voltage signal until said at least one of an amplitude and a phase of a response to said dither signal on the at least one first sense electrode (S1) reaches said first predetermined response value again.

According to embodiments of this presentation, said minimal coupling value is zero.

According to embodiments of this presentation, said first predetermined response value is obtained by: calibrating the first bias voltage signal with the Coriolis vibratory gyroscope operating in first environmental conditions such that said frequency difference ($\Delta \omega$) has said predetermined minimal value; adding said predetermined dither signal to second bias voltage signal applied to said at least one mode coupling electrode (BX1, BX2); and measuring said first predetermined response value on said at least one of an amplitude and a phase of a response to said dither signal on the at least one first sense electrode (S1).

According to embodiments of this presentation, said adding said predetermined dither signal comprises, without changing said first bias voltage signal, adding a predetermined series of dither signals of different frequencies to said second bias voltage signal; and selecting for said predetermined dither signal a dither signal frequency for which an amplitude of a response to said series of dither signal on the at least one first sense electrode (S1) is maximal.

According to embodiments of this presentation, said at least one of an amplitude and a phase of a response to said dither signal on the at least one first sense electrode is an amplitude of said response to said dither signal on the at least one first sense electrode (S1), and said first predetermined response value is a minimum value among the values of said amplitude of said response to said dither signal on the at least one first sense electrode when the first bias voltage signal varies along a predetermined value range.

According to embodiments of this presentation, said predetermined value range includes at least one value of the first bias voltage signal previously used for a predetermined time.

According to embodiments of this presentation, said at least one of an amplitude and a phase of a response to said dither signal on the at least one first sense electrode (S1) further comprises an amplitude and a phase of a response to said dither signal on the at least one second sense electrode (S2), and said first predetermined response value is a minimum value among the values of a combined amplitude of said response to said dither signal on the at least one first sense electrode (S1) and on the at least one second sense electrode (S2) when the first bias voltage signal varies along a predetermined value range.

According to embodiments of this presentation, said adding a predetermined dither signal to said second bias voltage signal comprises: adding a predetermined series of dither signals of different frequencies to said second bias voltage signal; and said comparing at least one of an amplitude and a phase of a response to said dither signal on the at least one first sense electrode (S1) to a first predetermined response value comprises: comparing said at least one of an amplitude and a phase of a response to said dither signal on the at least one first sense electrode to a series of first predetermined response values corresponding to the responses to said predetermined series of dither signals of different frequencies when said difference ($\Delta \omega$) has said predetermined minimal value.

Other embodiments of this presentation comprise a method of operating a Coriolis vibratory gyroscope, said Coriolis vibratory gyroscope having: an axisymmetric resonator with at least a first and a second n=2 degenerate vibratory modes, having respectively first and second mode resonance frequencies ($\omega 1$, $\omega 2$) wherein said first and second mode resonance frequencies differ by a frequency difference ($\Delta \omega$); and a plurality of electrodes arranged at a distance around a periphery of the resonator; said plurality of electrodes comprising at least one resonance frequency tuning electrode (BT1, BT2) arranged for, upon application of a first bias voltage signal to said at least one resonance frequency tuning electrode (BT1, BT2), acting on the frequency difference ($\Delta \omega$) by changing at least one of the first and second mode resonance frequencies; the method comprising generating said first bias voltage signal and regulating a value of said first bias voltage signal to maintain said frequency difference ($\Delta \omega$) at a predetermined minimal value.

According to embodiments of this presentation, said predetermined minimal value of said frequency difference ($\Delta\omega$) is zero.

According to embodiments of this presentation, said plurality of electrodes further comprise: at least one mode coupling electrode (BX1, BX2) arranged for acting on a coupling between the first and second vibratory modes by application of a second bias voltage signal to said at least one mode coupling electrode (BX1, BX2); and at least one first sense electrode (S1) and at least one second sense electrode (S2) arranged to respectively sense a motion of the resonator along the first and second vibratory modes; the method further comprising: sensing the at least one second sense electrode (S2) and in response generating said second bias voltage signal and regulating a value of said second bias voltage signal to maintain said coupling between the first and second vibratory modes at a minimal coupling value; wherein said generating said first bias voltage signal and regulating a value of said first bias voltage signal to maintain said frequency difference ($\Delta\omega$) at a predetermined minimal value comprises: adding a predetermined dither signal to said second bias voltage signal applied to said at least one mode coupling electrode (BX1, BX2); comparing at least one of an amplitude and a phase of a response to said dither signal on the at least one first sense electrode (S1) to a first predetermined response value; in case said at least one of an amplitude and a phase of a response to said dither signal on the at least one first sense electrode (S1) differs from said first predetermined response value, varying the first bias voltage signal until said at least one of an amplitude and a phase of a response to said dither signal on the at least one first sense electrode (S1) reaches said first predetermined response value again.

According to embodiments of this presentation, said minimal coupling value is zero.

According to embodiments of this presentation, the method comprises obtaining said first predetermined response value by: calibrating the first bias voltage signal with the Coriolis vibratory gyroscope operating in first environmental conditions such that said frequency difference ($\Delta\omega$) has said predetermined minimal value; adding said predetermined dither signal to said second bias voltage signal applied to said at least one mode coupling electrode (BX1, BX2); and measuring said first predetermined response value on said at least one of an amplitude and a phase of a response to said dither signal on the at least one first sense electrode (S1).

According to embodiments of this presentation, said adding said predetermined dither signal comprises: without changing said first bias voltage signal, adding a predetermined series of dither signals of different frequencies to said second bias voltage signal; and selecting for said predetermined dither signal a dither signal frequency for which an amplitude of a response to said series of dither signal on the at least one first sense electrode (S1) is maximal.

According to embodiments of this presentation, said at least one of an amplitude and a phase of a response to said dither signal on the at least one first sense electrode is an amplitude of said response to said dither signal on the at least one first sense electrode (S1), and said first predetermined response value is a minimum value among the values of said amplitude of said response to said dither signal on the at least one first sense electrode when the first bias voltage signal varies along a predetermined value range.

According to embodiments of this presentation, said predetermined value range includes at least one value of the first bias voltage signal previously used for a predetermined time.

According to embodiments of this presentation, said at least one of an amplitude and a phase of a response to said dither signal on the at least one first sense electrode (S1) further comprises an amplitude and a phase of a response to said dither signal on the at least one second sense electrode (S2), and said first predetermined response value is a minimum value among the values of a combined amplitude of said response to said dither signal on the at least one first sense electrode (S1) and on the at least one second sense electrode (S2) when the first bias voltage signal varies along a predetermined value range.

According to embodiments of this presentation, said adding a predetermined dither signal to said second bias voltage signal comprises: adding a predetermined series of dither signals of different frequencies to said second bias voltage signal; and said comparing at least one of an amplitude and a phase of a response to said dither signal on the at least one first sense electrode (S1) to a first predetermined response value comprises: comparing said at least one of an amplitude and a phase of a response to said dither signal on the at least one first sense electrode to a series of first predetermined response values corresponding to the responses to said predetermined series of dither signals of different frequencies when said difference ($\Delta\omega$) has said predetermined minimal value.

Other embodiments of this presentation comprise a CVG having an axisymmetric resonator with first and second degenerate vibratory modes, having respectively first and second mode resonance frequencies ($\omega1$, $\omega2$) wherein said first and second mode resonance frequencies differ by a frequency difference ($\Delta\omega$); a plurality of electrodes arranged at a distance around a periphery of the resonator; said plurality of electrodes comprising at least one resonance frequency tuning electrode arranged for, upon application of a first bias voltage signal to said at least one resonance frequency tuning electrode, acting on the frequency difference ($\Delta\omega$) by changing at least one of the first and second mode resonance frequencies; and a resonance frequency loop circuit arranged to generate said first bias voltage signal and regulate a value of said first bias voltage signal to maintain said frequency difference ($\Delta\omega$) at a predetermined minimal value.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 8 illustrates a method according to embodiments of this presentation.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Class II CVGs have resonators geometrically symmetrical about their sensing or input axis and have a resonator with at least two resonant modes along at least two principal elastic axes (anti-nodal axes). This presentation relates to CVGs having a resonator with two resonance modes along two anti-nodal axes, but it also applies, mutatis mutandis, to CVGs having more than two resonance modes.

Ideally, the resonant modes are orthogonal (are uncoupled) and they have identical resonance frequencies. In practice however, CVG resonators are not fabricated perfectly and some form of tuning (either mechanical tuning of the resonator by removal of material, or electrostatic tuning via application of balancing forces to the resonator) is required to get to a point where the resonance frequencies resonator are identical or at least minimally different. Mechanical tuning is long and expensive to implement. Electrostatic tuning generally comprises applying DC voltages to some tuning electrodes to repel or pull slightly the periphery of the resonator so as to correct the symmetry imperfections of the resonator, thus effectively allowing to match the resonance frequencies of the resonance modes of the resonator and/or to uncouple the resonance modes of the resonator.

Figure 1:
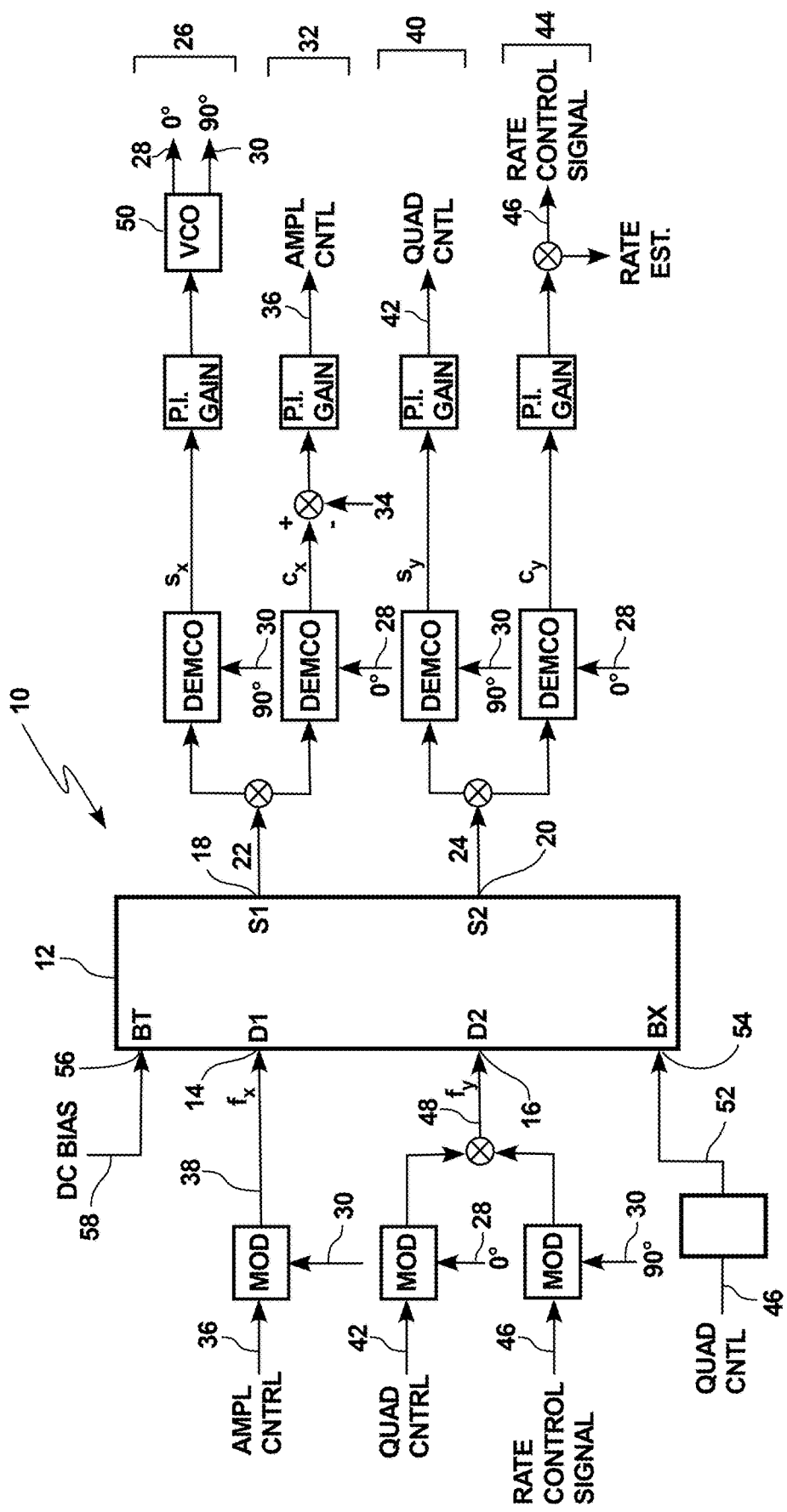
FIG. 1 illustrates a known CVG.

FIG. 1 illustrates a class II CVG 10 which comprises a two-resonance-modes-resonator 12 as well as a number of feedback loops that operate the resonator. The resonator 12 is axisymmetric and can for example be circular or polygonal. A plurality of sense and drive electrodes are arranged at a predetermined distance around a periphery of the resonator 12 to respectively push or pull on the periphery of the resonator in a radial direction including the drive electrode, and sense a motion of the periphery of the resonator in a radial direction including the sense electrode.

According to embodiments of this presentation, the drive electrodes comprise at least one first drive electrode (D1) 14 arranged to make resonator 12 oscillate along a first resonance mode and at least one second drive electrode (D2) 16 arranged to make resonator 12 oscillate along a second resonance mode. The sense electrodes comprise at least one first sense electrode (S1) 18 arranged to generate a first sense signal 22 proportional to the displacement of resonator 12 along the first mode and at least one second sense electrode (S2) 20 arranged to generate a second sense signal 24 proportional to the displacement of resonator 12 along the second mode.

CVG 10 further comprises a phase locked loop 26 receiving in input the first sense signal 22, and generating in output an in-phase reference signal 28 and a quadrature reference signal 30. An amplitude control loop 32 receives in input the first sense signal 22 as well as a reference amplitude value 34, and generates in output an amplitude control signal 36, wherein a first drive signal 38, which is provided to the at least one first drive electrode (S1) 14, is generated by modulating the amplitude control signal 36 with the quadrature reference signal 30. A quadrature-control loop 40 receives in input the second sense signal 24 and generates in output a quadrature control signal 42. A rate control loop 44 receives in input the second sense signal 24 and generates in output a rate control signal 46. A second drive signal 48, which is provided to the at least one second drive electrode (D2) 16, is generated by adding together a modulation of the quadrature control signal 42 with the in-phase reference signal 28, and a modulation of the rate control signal 46 with the quadrature reference signal 30.

In more detail, the phase locked loop 26 is arranged to demodulate the first sense signal 22 with the quadrature reference signal 30; the amplitude control loop 32 is arranged to demodulate the first sense signal 22 with the in-phase reference signal 28; the quadrature control loop 40 is arranged to demodulate the second sense signal 24 with the quadrature reference signal 30; and the rate control loop 44 is arranged to demodulate the second sense signal 24 with the in-phase reference signal 28. Further, the phase locked loop 26 is arranged to integrate the quadrature-demodulated first sense signal and provide the integrated signal to a voltage-controlled oscillator 50 that produces the in-phase reference signal 28 and quadrature reference signal 30; the amplitude control loop 32 is arranged to generate the amplitude control signal 36 by integrating a comparison of the reference amplitude value 34 with the in-phase demodulated first sense signal; the quadrature control loop 40 is arranged to generate the quadrature control signal 46 by integrating the quadrature-demodulated second sense signal; and the rate control loop 44 is arranged to generate the rate control signal 46 by integrating the in-phase demodulated second sense signal.

The quadrature control signal 46 can be used to set a bias DC voltage 52 on at least one mode coupling electrode (BX) 54 (preferably two or more mode coupling electrodes, arranged symmetrically with respect to the center of the resonator). Bias voltage 52 on coupling electrode 54 generates electrostatic forces that push or pull on the periphery of resonator 12 to effectively modify the stiffness of the resonator and bring the coupling between the first and second modes to a minimum (e.g. zero). Additionally, CVG 10 can comprise at least one resonance frequency tuning electrode (BT) 56 (preferably two or more resonance frequency electrodes, arranged symmetrically with respect to the center of the resonator), on which a calibration bias (DC) voltage 58 is applied to generate electrostatic forces that push or pull on the periphery of resonator 12 to change at least one of the resonance frequencies of the resonator, and bring a difference $\Delta\omega$ of the resonance frequencies to a minimum $\Delta\omega_0$ (e.g. zero).

There exists a technical prejudice that once voltage 58 is set to bring $\Delta\omega$ to a desired value $\Delta\omega_0$, it need not be changed, and it is assumed that the device is thereafter operated at its tuned point (see for example D. Lynch, "*Coriolis Vibratory Gyros*," in Proc. of Symposium Gyro Technology, Stuttgart, Germany, 1998, pp. 1.0-1.14. (Reproduced as Annex B, Coriolis Vibratory Gyros, pp. 56-66 of IEEE Std. 1431-2004. IEEE Standard Specification Format Guide and Test Procedure of Coriolis Vibratory Gyros, IEEE Aerospace and Electronic Systems Society, 20 Dec. 2004.).).

It is known that a CVG can be sensitive to its operating conditions. There exist ways of making a CVG less sensitive to changes in its operational environments, which typically require environmental control of the sensor (i.e. sensor ovenization to maintain a constant temperature, vibration isolation to minimize vibration imparted to the sensor, stress-relieving structures to minimize the stress on the sensor) or compensation algorithms that take the sensor output and attempt to correlate them with other sensor readings (like temperature or acceleration) to reduce any sensitivity of the gyroscope to inputs other than rotation rate.

Prior art aimed at correcting for gyroscope bias errors include U.S. Pat. No. 9,212,908B2 (MEMS gyroscopes with reduced errors), US20200088518A1 (Vibratory error compensation in a tuning fork gyroscope such as a CVG), U.S. Pat. No. 6,725,719B2 (MEMS-INTEGRATED INERTIAL MEASUREMENT UNITS ON A COMMON SUBSTRATE), where corrections rely on the readout of other sensors collocated with the gyroscope, including accelerometers and thermometers to derive correlations to gyroscope errors. Alternative prior art relies on post-processing of gyroscope signals, such as U.S. Pat. No. 8,548,766B2 (Systems and methods for gyroscope calibration), which suffer from the compensation errors and do not maintain the operating point of the gyroscope if it changes during operation. Alternative prior art, such as U.S. Ser. No. 10/571, 267B1 (HIGH STABILITY ANGULAR SENSOR) outlines locking the frequency of the gyroscope to a stable external clock to determine changes in mode frequency, no such clock is required for the method outlined in this presentation.

The Inventors have noted that the electrostatic tuning of the resonant modes is generally only valid for some operating conditions in which the CVG was when it was tuned, and therefore becomes more or less invalid when some operating conditions change. For example, if the CVG is tuned to have $\Delta\omega <= \Delta\omega_0$ with a given bias voltage 58 when operating with the resonator 12 being horizontal, bias voltage 58 may become incapable of maintaining $\Delta\omega <= \Delta\omega_0$ when the resonator 12 is not horizontal anymore, depending on any symmetry faults of the resonator and the position of said faults with respect to vertical. Vibrations or temperature changes can also cause a set tuning voltage to become invalid.

CVGs of the prior art do not have any active tuning of the resonance frequency of the resonance modes of their resonator, contrary to embodiments of this presentation. Prior art for hemispherical resonator gyroscope sensors do not include active resonance frequency tuning because the sensors were not designed with that mode of tuning capability, as they are mechanically trimmed instead of electrostatically tuned. In general, any gyroscope that employs mechanical trimming to achieve a mode match does not employ active resonance frequency matching via electrostatic tuning.

Embodiments of this presentation comprise a CVG that employs active resonance frequency matching via electrostatic tuning, and is thereby able to react in real-time to any changes in tuning and correct itself to maintain mode symmetry. This greatly simplifies the design of inertial measurement unit systems that operate the CVG, and reduces the CVG sensitivity to external environmental factors to reach higher performance levels than were achievable with previous control schemes. This ultimately allows for lower cost, more compact and environmentally resilient sensors for many applications, including weapon systems, vehicle safety, autonomous navigation, and emergency location services.

Figure 2:
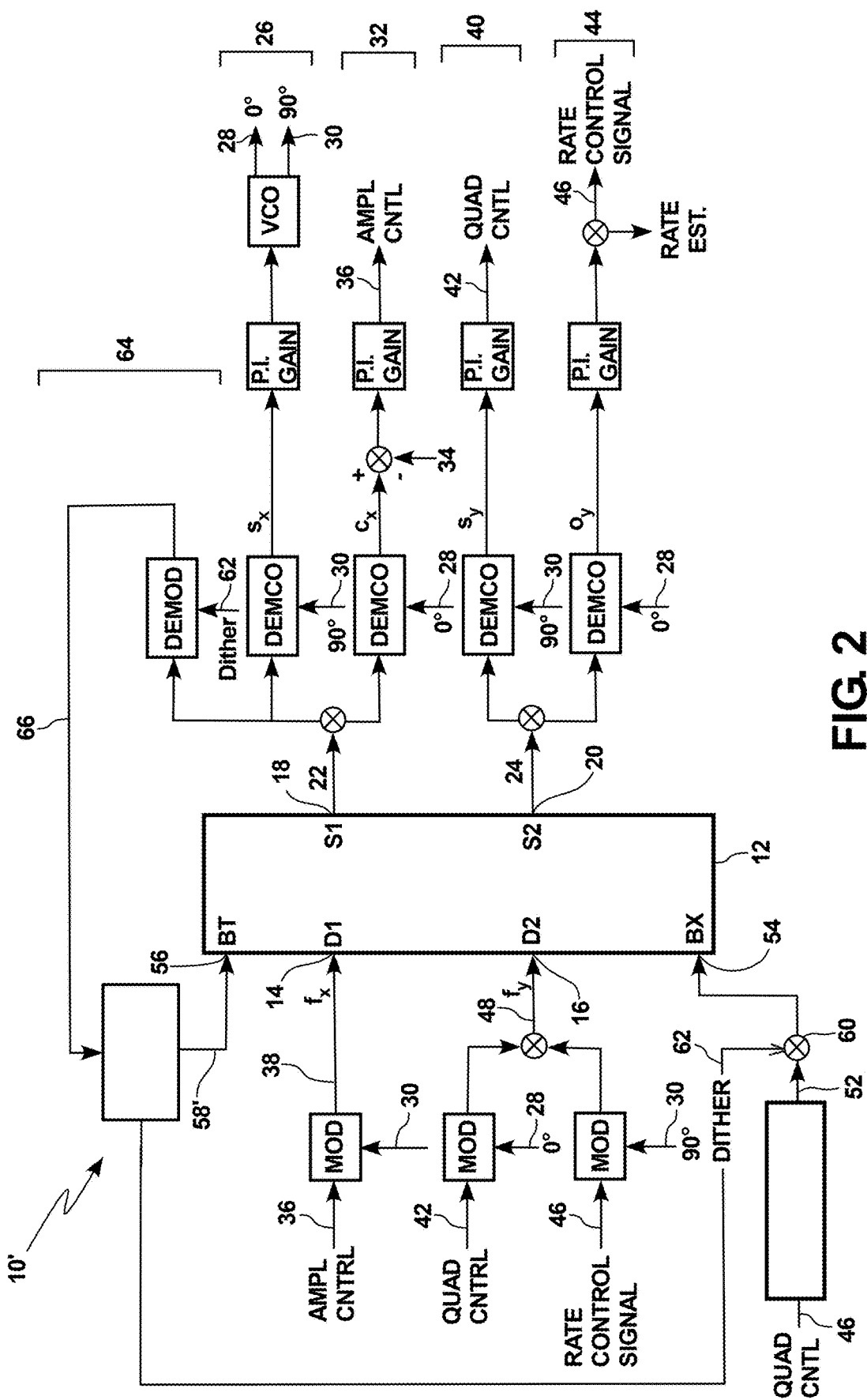
FIG. 2 illustrates a CVG according to embodiments of this presentation.

FIG. 2 illustrates schematically a CVG 10' according to embodiments of this presentation, which is largely identical to the CVG 10 described previously. As CVG 10, CVG 10' comprises an axisymmetric resonator 12 with at least a first and a second n=2 degenerate vibratory modes, having respectively first and second mode resonance frequencies ($\omega1$, $\omega2$) wherein said first and second mode resonance frequencies differ by a frequency difference ($\Delta\omega$) for example due to manufacturing imperfections. CVG 10' comprises a plurality of electrodes (14, 16, 18, 20, 54, 56) arranged at a distance around a periphery of the resonator 12, said plurality of electrodes comprising at least one resonance frequency tuning electrode 56 (BT) arranged for, upon application of a resonance frequency tuning voltage 58, acting on the frequency difference $\Delta\omega$ by changing at least one of the first and second mode resonance frequencies ($\omega1$ or $\omega2$). The plurality of electrodes also comprise at least one mode coupling electrode (BX) 54 arranged such that a bias voltage 52 on coupling electrode 54 generates electrostatic forces that push or pull on the periphery of resonator 12 to bring the off-diagonal coupling between the first and second modes to a desired value (e.g. zero).

As detailed hereafter, CVG 10' essentially differs from CVG 10 in that it additionally comprises: a/ a circuit 60 that controllably adds a dither signal 62 to the bias voltage 52 provided to the at least one mode coupling electrode 54; and b/ a resonance frequency loop 64 that uses a demodulation of first sensing signal 22 with the dither signal 62 to generate and regulate a bias signal 58' which is provided to the at least one resonance frequency tuning electrode 56 (BT) to maintain at a predetermined minimal value ($<=\Delta\omega_0$) the frequency difference ($\Delta\omega$) of the first and second mode resonance frequencies. According to embodiments of the presentation, $\Delta\omega_0$ may be any suitable value, including zero.

As CVG 10, CVG 10' comprises a quadrature control loop 44 arranged between second sense electrode 20 (S2) and the at least one mode coupling electrode 54 (BX) to generate and regulate the bias voltage signal 52 to maintain the coupling between the first and second vibratory modes at a minimal coupling value (for example, zero coupling). However, in CVG 10', the additional resonance frequency loop 64 is arranged to generate and regulate said bias voltage signal 58' by: adding a predetermined dither signal 62 (an AC signal that can be in the 0.1 Hz to 100 Hz frequency range and 1 mV to 1 V amplitude range) to the bias voltage 52 signal applied to the at least one mode coupling electrode 54 (BX); then compare a response 66 to said dither signal 62 on the at least one first sense electrode 18 (S1) with a first predetermined response value; and in case the response 66 differs from the first predetermined response value, vary the bias voltage signal 58' until the response 66 to the dither signal 62 reaches said first predetermined response value.

According to embodiments of this presentation, response 66 can be one of the amplitude and phase of a demodulation (by a demodulator 65) of the first sensing signal 22 by the dither signal 62. As detailed hereafter, the response 66, in output of the demodulator 65, has for example a minimum amplitude and a zero phase when CVG 10' is at $\Delta\omega=0$. If the response 66 of demodulator 65 deviates from this condition, a correction signal is applied to resonance frequency tuning electrode 56 (BT) to recover a tuned state with feedback loop 64.

According to embodiments of this presentation, the first predetermined response value of response 66 can be obtained by: initially calibrating bias voltage signal 58' with CVG 10' operating in first environmental conditions (i.e. calibration conditions) such that the frequency difference ($\Delta\omega$) has said predetermined minimal value (i.e. $<=\Delta\omega_0$ with for example $\Delta\omega_0=0$); then, adding the predetermined dither signal 62 to the bias voltage signal 52 applied to mode coupling electrode 54 (BX); and then, memorizing the value of the response 66 to the dither signal 62 as said first predetermined response value.

According to embodiments of this presentation, the step of adding the predetermined dither signal 62 to bias voltage 52 can comprise: without changing the bias voltage signal 58', adding a predetermined series of dither signals 62 having each one of a plurality of frequencies to the second bias voltage signal 52; and choosing as said predetermined dither signal the dither signal of the predetermined series for which an amplitude of the response 66 was maximal.

According to embodiments of this presentation the resonance frequency loop 64 can use the amplitude of response 66 and said first predetermined response value can be found by: varying the bias voltage signal 58' is along a predetermined range; and choosing said first predetermined response value as the minimum value of the amplitude of response 66 to the predetermined dither signal 62 for all the varied bias voltage signals 58'. Said predetermined range can for example comprise a value of bias voltage signal 58' obtained at calibration.

Instead of adding a single dither signal 62 to bias voltage 52 and then comparing the amplitude of the response 66 with an expected/predetermined value, resonance frequency loop 64 can alternatively be provided to add a predetermined series of dither signals 62 of different frequencies to said bias voltage 52; and compare the amplitude of the response 66 to the series of dither signal to a series of expected amplitudes of response 66 acquired for example during a calibration step with a desired difference ($\Delta\omega$).

Figure 3:
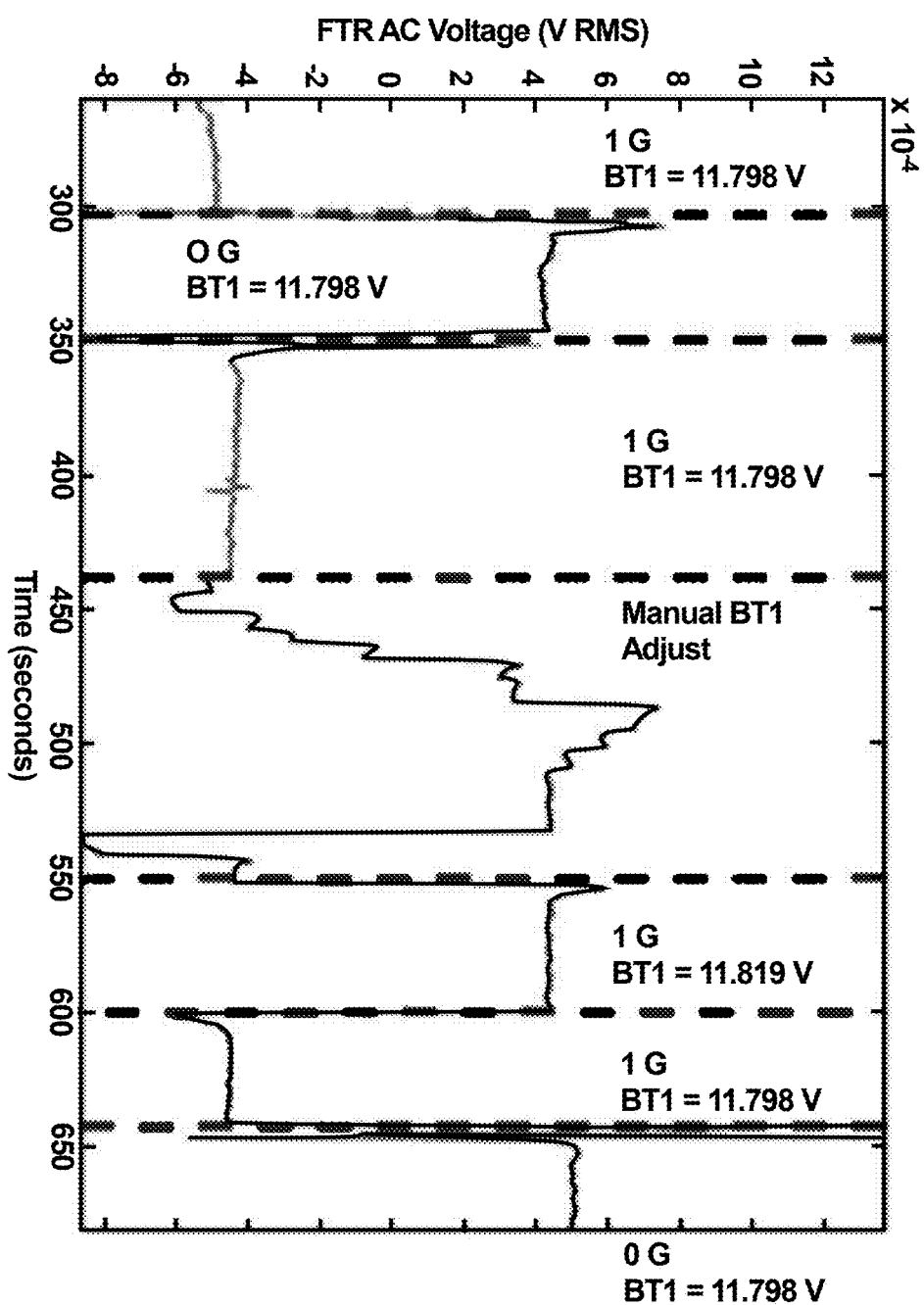
FIG. 3 illustrates a response to a dither added in the mode coupling loop for different bias voltages applied to the mode resonance frequency tuning electrodes, for different operating conditions of the CVG.

FIG. 3 illustrates changes of the amplitude of response 66 to a fixed dither 62 for: a/ different bias voltages 58' over time and b/ different operating conditions of the CVG over time. Time starts at t=250 in FIG. 3. Between t=250 and t=300, bias voltage 58' was fixed at 11.798 volts and the resonator was arranged vertically (acceleration of 1 G). The amplitude of response 66 was of about −5 volts. Between t=300 and t=350, bias voltage 58' was still fixed at 11.798 volts and the resonator was arranged horizontally (acceleration of 0 G). The amplitude of response 66 was of about +4 volts. Between t=350 and t=440, bias voltage 58' was still fixed at 11.798 volts and the resonator was returned vertically (acceleration of 1 G). The amplitude of response 66 returned to about −5 volts. This demonstrates that the change of gravity acceleration on the resonator can create an unbalance of the resonator due to symmetry imperfections of the resonator, and that this unbalance can be measured by the amplitude of the response 66 to the addition of dither 62 on bias 52. In this example, the CVG was calibrated so that $\Delta\omega=0$ with the resonator horizontal (0 G) so the amplitude of response 66 between t=300 and t=350 is a value that would be desired even when the acceleration goes from 0 G to 1 G.

Between t=440 and t=600, the inventors manually adjusted bias voltage 58' to bring response 66 to the value (+4 volt) obtained with the initial voltage 58' for 0 G, but this time still with 1 G of acceleration. In the illustrated example, it was found that a new voltage 58' of 11.819 volts 58' brings response 66 to about +4 volt ($\Delta\omega=0$) with 1 G of acceleration. This illustrates that a change of bias voltage 58' can compensate the effect of a change of acceleration on the resonator/operating conditions of the CVG.

Between t=600 and t=650, the inventors brought back bias voltage 58' to 11.798 volts, still with the resonator vertical (1 G of acceleration), and the amplitude of response 66 fell back to about −5 volts. Finally, between t=650 and t=700, the inventors brought back the resonator to a horizontal position (0 G), still with bias voltage 58' to 11.798 volts, and the amplitude of response 66 came back up to about +4 volts.

Figure 4:
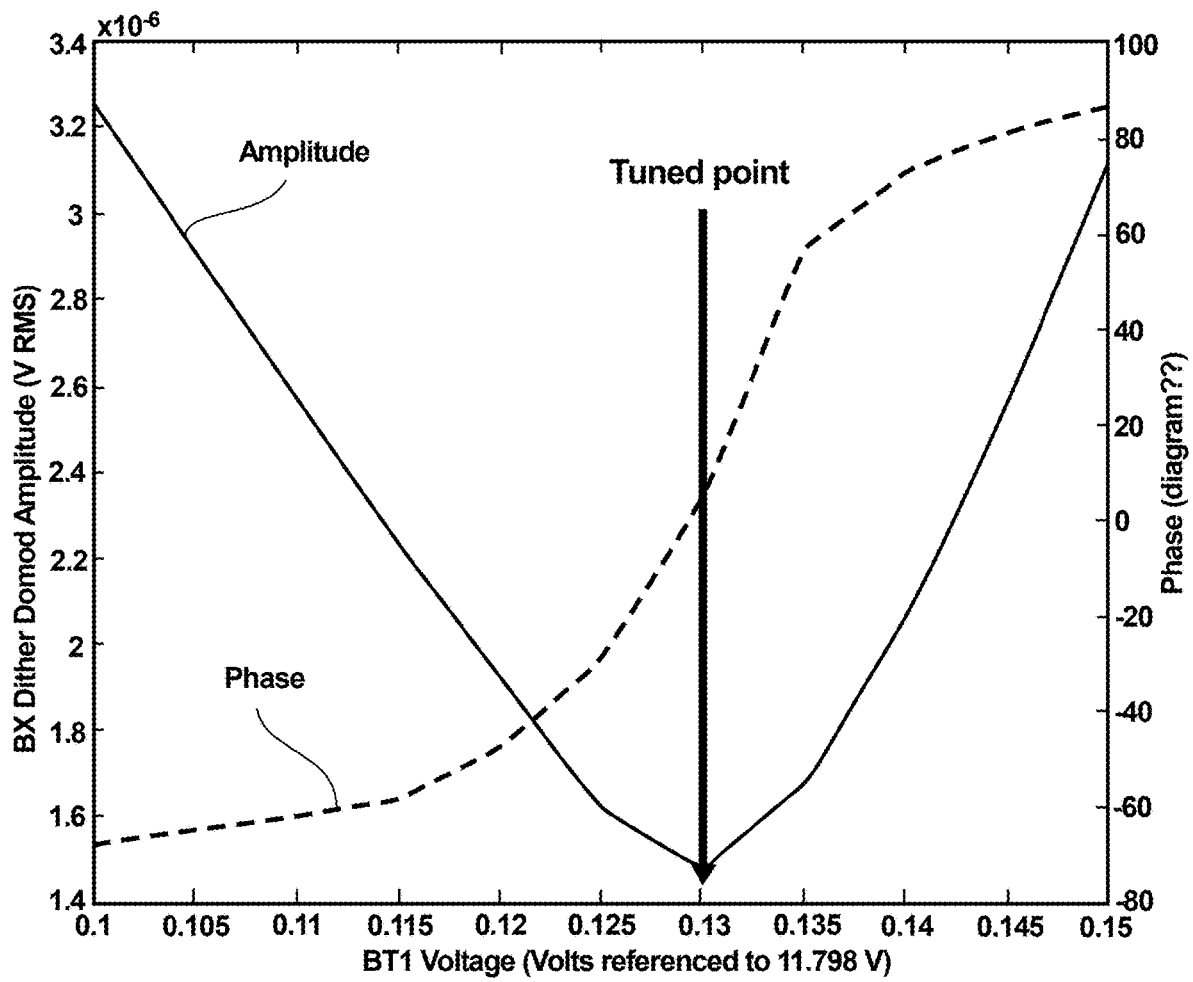
FIG. 4 illustrates the amplitude and phase of the response to the dither when the resonance frequency bias voltage is changed.

FIG. 4 illustrates the amplitude and phase of the response 66 to dither 62 for various bias voltages 58'. In the illustrated example, the tuned CVG having a bias voltage 58' of 11.798 achieving $\Delta\omega=0$ at 0 G was tilted, thus causing $\Delta\omega$ to change and un-tuning the amplitude and phase of response 66 to dither 62. Bias voltage 58' was then gradually increased, causing the amplitude of response 66 to first decrease to a low point before increasing again, while the phase of response 66 kept changing. It is to be noted that the phase of response 66 was equal to zero when the amplitude of response 66 was minimal. According to embodiments of this presentation, the bias voltage 58' that brings the amplitude of response 66 to a minimum or its phase to zero is the bias voltage 58' that brings $\Delta\omega$ back to 0 (or tuned point of operation). As the phase of response 66 shows a steep slope at the tuned point, embodiments of this presentation can use the phase of response 66 in the resonance frequency loop 64 to maintain the CVG at the tuned point.

Figure 5:
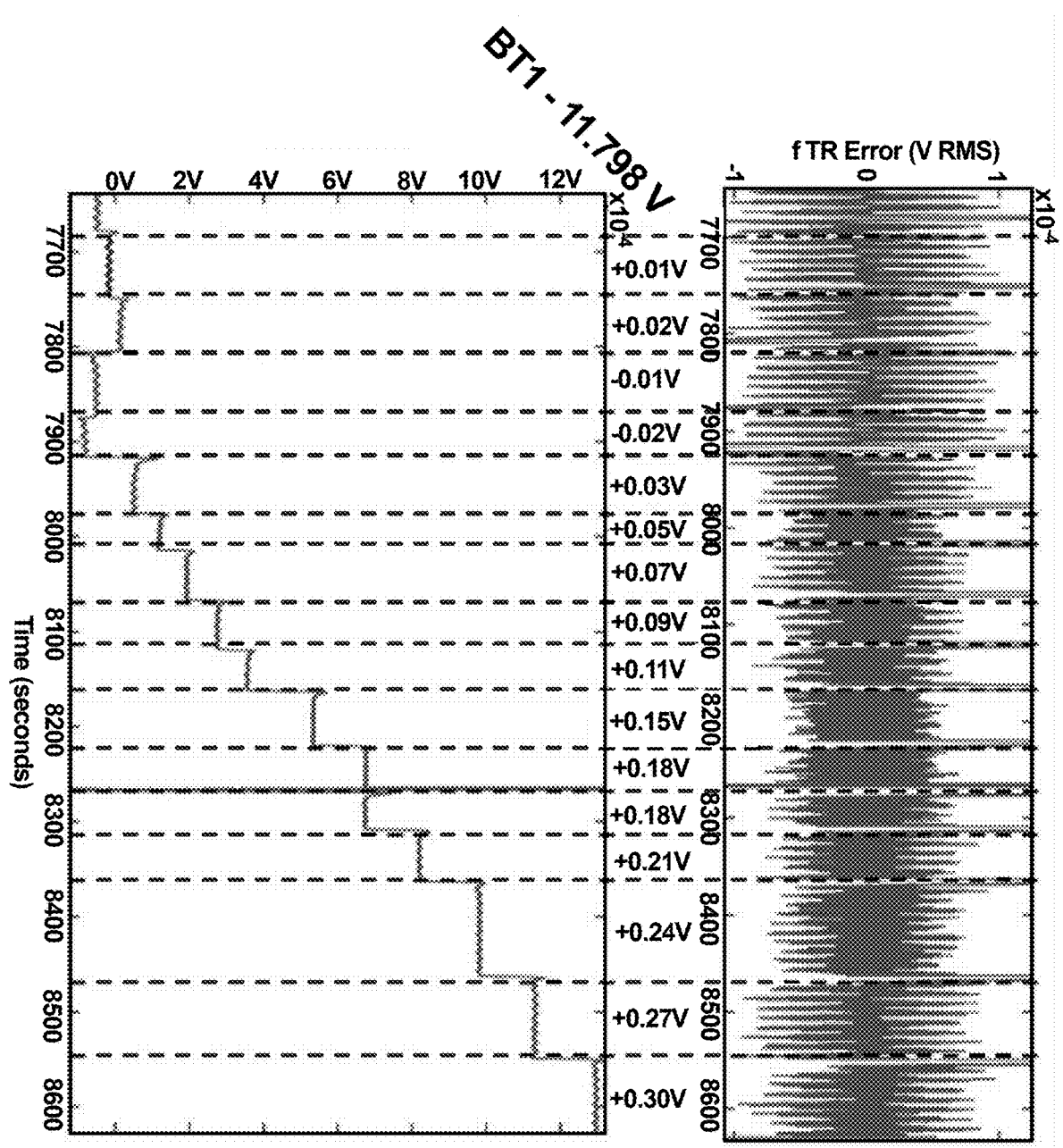
FIG. 5 is a time domain representation of the amplitude and phase data in FIG. 4.

FIG. 5 is a time domain representation of the amplitude (bottom part of FIG. 5) and phase (top part of FIG. 5) data on FIG. 4.

Figure 6A:
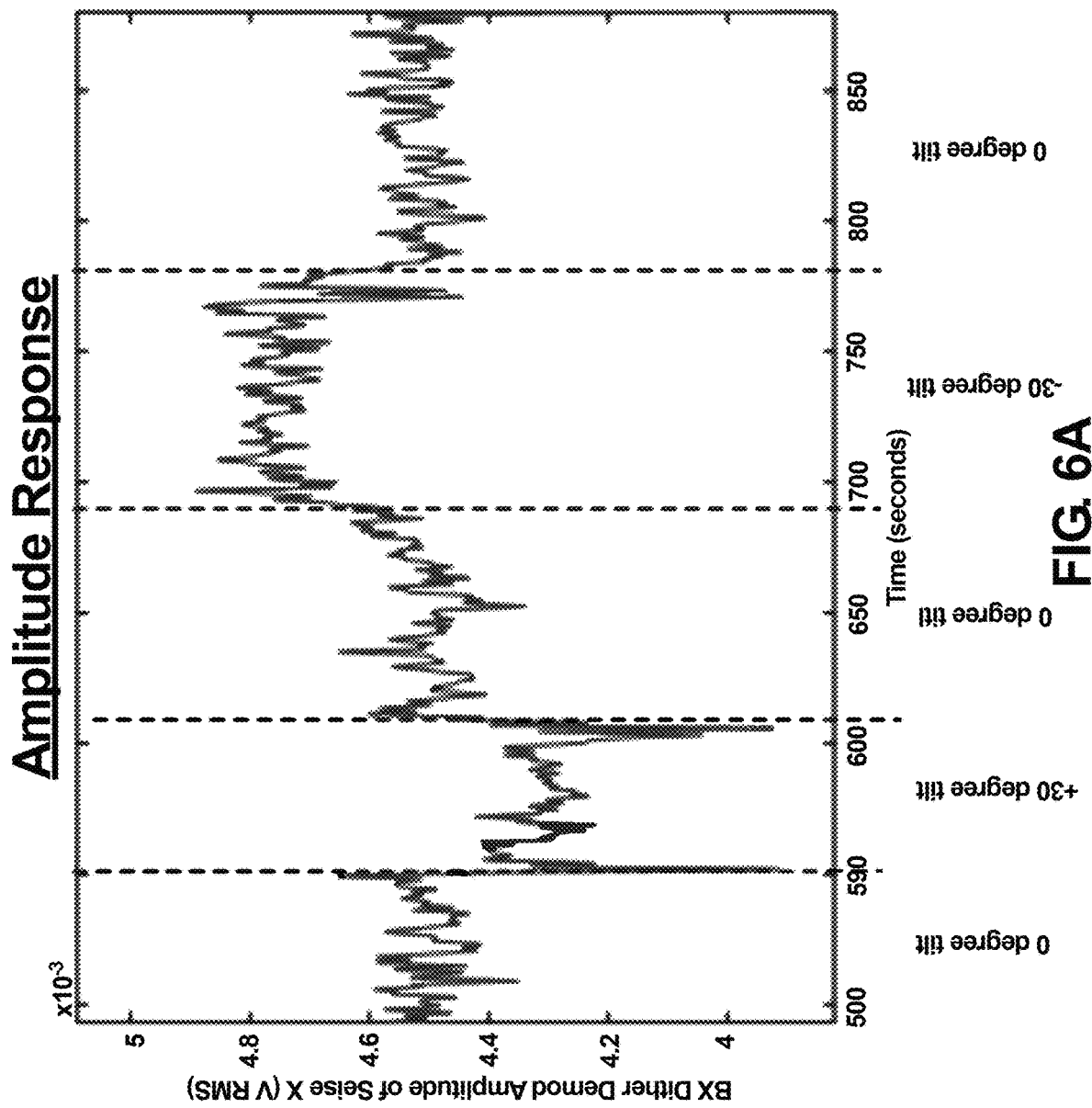
FIGS. 6A and 6B illustrate the amplitude and phase of a response to a dither in the mode coupling loop for different operating conditions of the CVG.
Figure 6B:
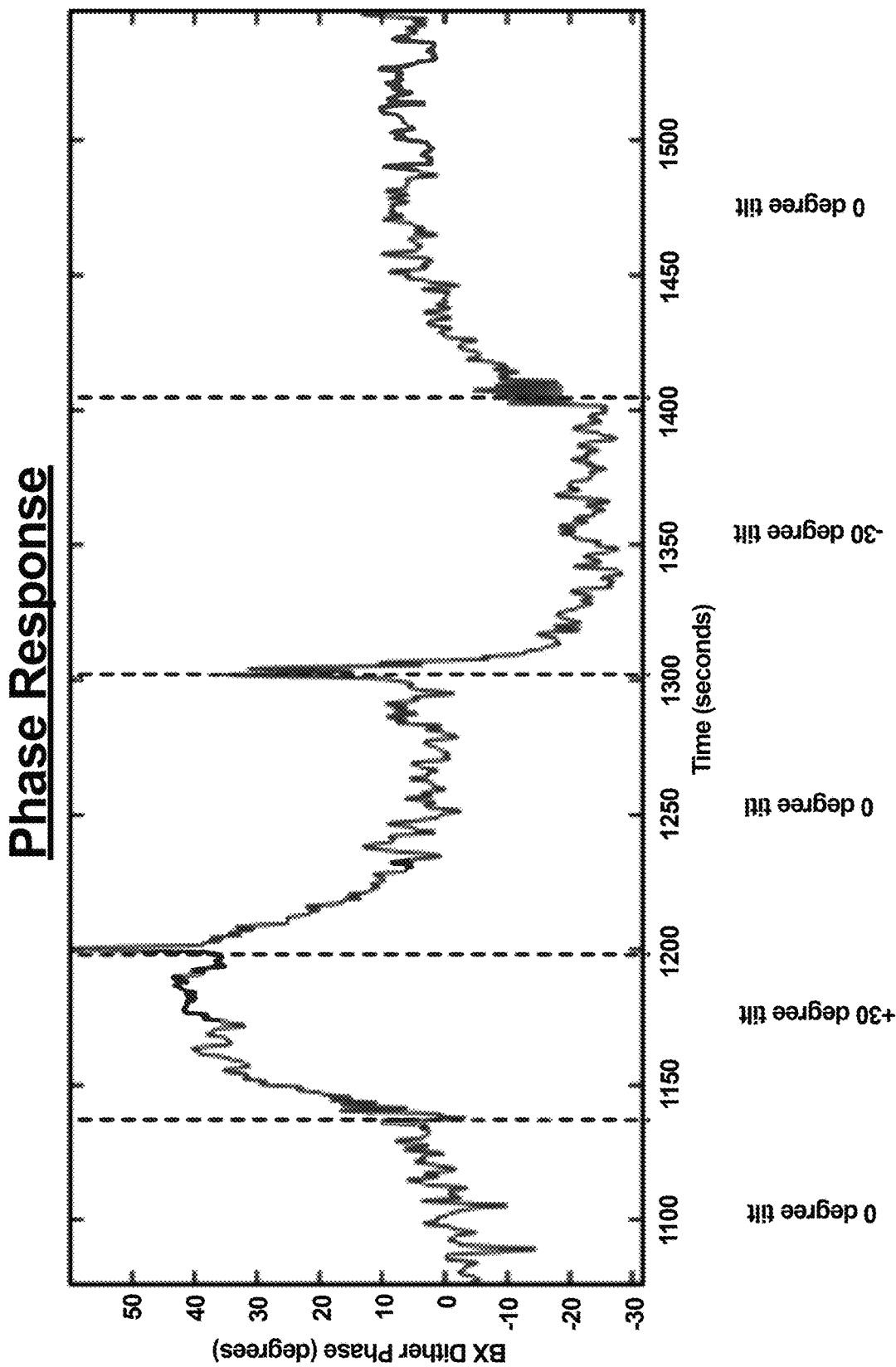

FIGS. 6A and 6B illustrate the amplitude and phase of a response to a dither in the mode coupling loop for different operating conditions of the CVG around a tuned point of operation. FIG. 6A shows the amplitude of response 66 to a 1 Hz, 10 mV dither when the CVG is moved from a tuning operating condition with its resonator horizontal (0 G) to an operating condition with the resonator tilted −30 degree, then back to horizontal, then with the resonator tilted +30 degree, then back to horizontal. It can be seen that the amplitude varies symmetrically to one side or the other of the response to the horizontal operating conditions when the resonator is oriented to one side or the other of the horizontal. FIG. 6B consistently shows that the phase of response 66 is zero at 0 G in the tuned point of operation, and changes up or down respectively when the resonator is tilted −30 degree and +30 degree. In some embodiments, the signal-to-noise ratio can be improved when looking at the phase of response 66 compared to the amplitude of response 66 since the slope of the phase is maximized at the tuned point. FIGS. 6A and 6B show that either the amplitude or the phase of response 66 can be used in resonance frequency loop 64.

The embodiments illustrated hereabove use the response 66 in resonance frequency loop 64 to regulate the bias voltage 58' to maintain $\Delta\omega$ equal to zero. However, if for some reasons, for example because the resonator is too asymmetrical to achieve $\Delta\omega=0$, a resonance frequency feedback loop according to embodiments of this presentation can be arranged to maintain $\Delta\omega$ under a predetermined value $\Delta\omega_0$ that will represent the best-tuned point of operation of the CVG. Also, the resonance frequency feedback loop can use more response data than the resonance frequency feedback loop 64 illustrated above.

Figure 7:
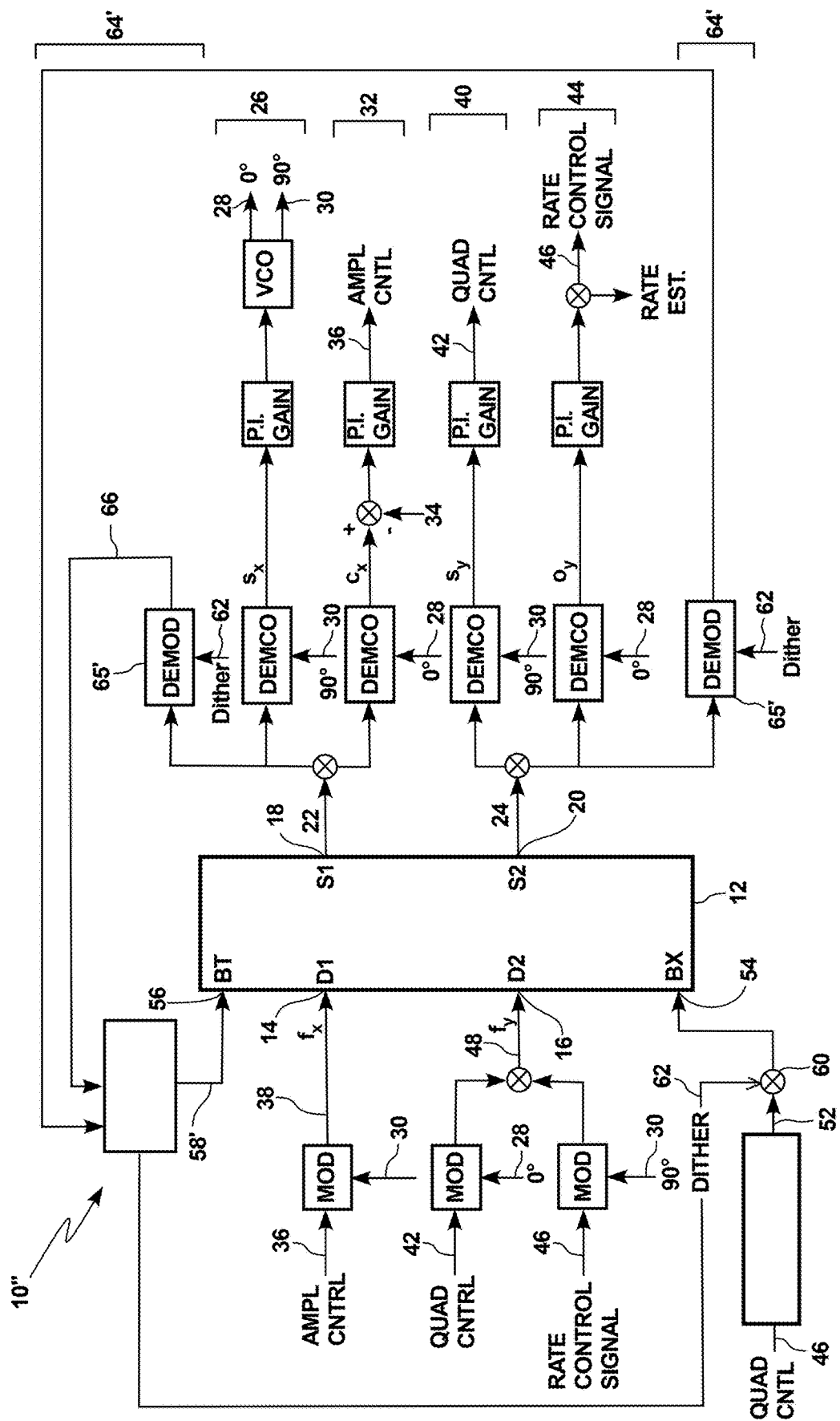
FIG. 7 illustrates a CVG according to embodiments of this presentation.

FIG. 7 illustrates a CVG 10" according to embodiments of this presentation, which essentially differs from the CVG 10' in that instead of using resonance frequency loop 64 to generate and regulate the bias voltage 58', it uses a different resonance frequency loop 64' to generate and regulate the bias voltage 58'. In addition to using response 66, resonance frequency loop 64' uses a response 66' to the addition of dither 62 on bias voltage 52, as measured on the second sense electrode 20 of CVG 10". Response 66' is demodulated in a similar way as response 66. Due to the difference in phase between response 66 and response 66', resonance frequency loop 64' uses both the amplitude and phase of responses 66, 66' to generate a composite amplitude signal representative of the deformation/motion of resonator 12 along its first and second resonance modes. In such an embodiment, bias voltage 58' is regulated so that the composite amplitude signal goes back to a predetermined response value after a change in operational conditions that causes a previously set bias voltage 58' to become obsolete.

FIG. 8 illustrates a method 100 according to embodiments of this presentation, of operating a CVG. As outlined previously, the CVG has an axisymmetric resonator with at least a first and a second n=2 degenerate vibratory modes, with respectively first and second mode resonance frequencies ($\omega1$, $\omega2$) where the first and second mode resonance frequencies naturally differ (e.g. due to a fabrication defect) by a frequency difference ($\Delta\omega$); and a plurality of electrodes arranged at a distance around a periphery of the resonator, said plurality of electrodes comprising at least one resonance frequency tuning electrode (BT1, BT2) arranged for, upon application of a first bias voltage signal to said at least one resonance frequency tuning electrode (BT1, BT2), acting on the frequency difference ($\Delta\omega$) by changing at least one of the first and second mode resonance frequencies. According to embodiments of this presentation, method 100 comprises generating said first bias voltage signal and regulating a value of said first bias voltage signal to maintain said frequency difference ($\Delta\omega$) at a predetermined minimal value. According to embodiments of this presentation, the above generating and regulating said first bias voltage signal comprises:

Setting (102) said first bias voltage, for example at a calibration step, to achieve a desired set point of operation.

Adding (104) a predetermined dither to a second DC voltage input of a second loop that maintains a minimal coupling (e.g. zero coupling) between the first and second vibratory modes in response to at least one motion amplitude signal along at least one of the first and second vibratory modes;

Comparing (106) the response to the added dither in at least one signal indicative of the amplitude of the motion of the CVG resonator along at least one mode of the resonator with an expected minimal value;

In case the response matches (108) the expected value, keep the value of the first bias voltage signal as it is and continue monitoring the dither response; and in case the response does not match (110) the expected value, change (112) the value of the first bias voltage signal and continue adding (104) the dither and monitoring (106) the dither response.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this presentation with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this presentation is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . . "

What is claimed is:

1. A Coriolis vibratory gyroscope having:
   an axisymmetric resonator with at least a first and a second n=2 degenerate vibratory modes, having respectively first and second mode resonance frequencies ($\omega1$, $\omega2$) wherein said first and second mode resonance frequencies naturally differ by a first natural frequency difference ($\Delta\omega$);
   a plurality of electrodes arranged at a distance around a periphery of the resonator;
   said plurality of electrodes comprising at least one resonance frequency tuning electrode (BT1, BT2) arranged for, upon application of a first bias voltage signal to said at least one resonance frequency tuning electrode (BT1, BT2), changing at least one of the first and second mode resonance frequencies to reduce a difference between the first and second mode resonance frequencies below said first natural frequency difference ($\Delta\omega$); and
   a resonance frequency loop circuit arranged to, while the Coriolis vibratory gyroscope is in operation, generate said first bias voltage signal and regulate a value of said first bias voltage signal to maintain in real time the difference between the first and second mode resonance frequencies at a predetermined minimal value ($\Delta\omega_0$) smaller than said first natural frequency difference ($\Delta\omega$) when a change in operating conditions causes the natural difference between the first and second mode resonance frequencies to change.

2. The Coriolis vibratory gyroscope of claim 1, wherein said predetermined minimal value ($\Delta\omega_0$) of said difference between the first and second mode resonance frequencies is zero.

3. The Coriolis vibratory gyroscope of claim 1, wherein said plurality of electrodes further comprise:
   at least one mode coupling electrode (BX1, BX2) arranged for acting on a coupling between the first and second vibratory modes by application of a second bias voltage signal to said at least one mode coupling electrode (BX1, BX2); and
   at least one first sense electrode (S1) and at least one second sense electrode (S2) arranged to respectively sense a motion of the resonator along the first and second vibratory modes;

the Coriolis vibratory gyroscope further comprising a quadrature control loop arranged between the at least one second sense electrode (S2) and the at least one mode coupling electrode (BX1, BX2) to generate said second bias voltage signal and regulate a value of said second bias voltage signal to maintain said coupling between the first and second vibratory modes at a minimal coupling value;

wherein said resonance frequency loop circuit is arranged to generate said first bias voltage signal and regulate a value of said first bias voltage signal to maintain said difference between the first and second mode resonance frequencies at a predetermined minimal value by:

adding a predetermined dither signal to said second bias voltage signal applied to said at least one mode coupling electrode (BX1, BX2);

comparing at least one of an amplitude and a phase of a response to said dither signal on the at least one first sense electrode (S1) to a first predetermined response value;

in case said at least one of an amplitude and a phase of a response to said dither signal on the at least one first sense electrode (S1) differs from said first predetermined response value, varying the first bias voltage signal until said at least one of an amplitude and a phase of a response to said dither signal on the at least one first sense electrode (S1) reaches said first predetermined response value again.

4. The Coriolis vibratory gyroscope of claim 3 wherein said minimal coupling value is zero.

5. The Coriolis vibratory gyroscope of claim 3, wherein said first predetermined response value is obtained by:

calibrating the first bias voltage signal with the Coriolis vibratory gyroscope operating in first environmental conditions such that said difference between the first and second mode resonance frequencies has said predetermined minimal value;

adding said predetermined dither signal to said second bias voltage signal applied to said at least one mode coupling electrode (BX1, BX2); and measuring said first predetermined response value on said at least one of an amplitude and a phase of a response to said dither signal on the at least one first sense electrode (S1).

6. The Coriolis vibratory gyroscope of claim 5, wherein said adding said predetermined dither signal comprises, without changing said first bias voltage signal, adding a predetermined series of dither signals of different frequencies to said second bias voltage signal; and selecting for said predetermined dither signal a dither signal frequency for which an amplitude of a response to said series of dither signal on the at least one first sense electrode (S1) is maximal.

7. The Coriolis vibratory gyroscope of claim 3, wherein said at least one of an amplitude and a phase of a response to said dither signal on the at least one first sense electrode is an amplitude of said response to said dither signal on the at least one first sense electrode (S1), and said first predetermined response value is a minimum value among the values of said amplitude of said response to said dither signal on the at least one first sense electrode when the first bias voltage signal varies along a predetermined value range.

8. The Coriolis vibratory gyroscope of claim 7, wherein said predetermined value range includes at least one value of the first bias voltage signal previously used for a predetermined time.

9. The Coriolis vibratory gyroscope of claim 3, wherein said at least one of an amplitude and a phase of a response to said dither signal on the at least one first sense electrode (S1) further comprises an amplitude and a phase of a response to said dither signal on the at least one second sense electrode (S2), and said first predetermined response value is a minimum value among the values of a combined amplitude of said response to said dither signal on the at least one first sense electrode (S1) and on the at least one second sense electrode (S2) when the first bias voltage signal varies along a predetermined value range.

10. The Coriolis vibratory gyroscope of claim 3, wherein said adding a predetermined dither signal to said second bias voltage signal comprises: adding a predetermined series of dither signals of different frequencies to said second bias voltage signal; and said comparing at least one of an amplitude and a phase of a response to said dither signal on the at least one first sense electrode (S1) to a first predetermined response value comprises: comparing said at least one of an amplitude and a phase of a response to said dither signal on the at least one first sense electrode to a series of first predetermined response values corresponding to the responses to said predetermined series of dither signals of different frequencies when said difference between the first and second mode resonance frequencies has said predetermined minimal value.

11. A method of operating a Coriolis vibratory gyroscope, said Coriolis vibratory gyroscope having:

an axisymmetric resonator with at least a first and a second n=2 degenerate vibratory modes, having respectively first and second mode resonance frequencies ($\omega_1$, $\omega_2$) wherein said first and second mode resonance frequencies naturally differ by a first frequency difference ($\Delta\omega$); and a plurality of electrodes arranged at a distance around a periphery of the resonator;

said plurality of electrodes comprising at least one resonance frequency tuning electrode (BT1, BT2) arranged for, upon application of a first bias voltage signal to said at least one resonance frequency tuning electrode (BT1, BT2), changing at least one of the first and second mode resonance frequencies to reduce a difference between the first and second mode resonance frequencies below said first frequency difference ($\Delta\omega$);

the method comprising, while the Coriolis vibratory gyroscope is in operation, generating said first bias voltage signal and regulating a value of said first bias voltage signal to maintain in real time the difference between the first and second mode resonance frequencies at a predetermined minimal value ($\Delta\omega_0$) smaller than said frequency difference ($\Delta\omega$) when a change in operating conditions causes the natural difference between the first and second mode resonance frequencies to change.

12. The method of claim 11, wherein said predetermined minimal value ($\Delta\omega_0$) of said difference between the first and second mode resonance frequencies is zero.

13. The method of claim 11, wherein said plurality of electrodes further comprise:

at least one mode coupling electrode (BX1, BX2) arranged for acting on a coupling between the first and second vibratory modes by application of a second bias voltage signal to said at least one mode coupling electrode (BX1, BX2); and at least one first sense electrode (S1) and at least one second sense electrode (S2) arranged to respectively sense a motion of the resonator along the first and second vibratory modes;

the method further comprising:

sensing the at least one second sense electrode (S2) and in response generating said second bias voltage signal and regulating a value of said second bias voltage signal to maintain said coupling between the first and second vibratory modes at a minimal coupling value;

wherein said generating said first bias voltage signal and regulating a value of said first bias voltage signal to maintain said difference between the first and second mode resonance frequencies at a predetermined minimal value comprises:

adding a predetermined dither signal to said second bias voltage signal applied to said at least one mode coupling electrode (BX1, BX2);

comparing at least one of an amplitude and a phase of a response to said dither signal on the at least one first sense electrode (S1) to a first predetermined response value;

in case said at least one of an amplitude and a phase of a response to said dither signal on the at least one first sense electrode (S1) differs from said first predetermined response value, varying the first bias voltage signal until said at least one of an amplitude and a phase of a response to said dither signal on the at least one first sense electrode (S1) reaches said first predetermined response value again.

14. The method of claim 13, wherein said minimal coupling value is zero.

15. The method of claim 13, comprising obtaining said first predetermined response value by:

calibrating the first bias voltage signal with the Coriolis vibratory gyroscope operating in first environmental conditions such that said difference between the first and second mode resonance frequencies has said predetermined minimal value;

adding said predetermined dither signal to said second bias voltage signal applied to said at least one mode coupling electrode (BX1, BX2); and measuring said first predetermined response value on said at least one of an amplitude and a phase of a response to said dither signal on the at least one first sense electrode (S1).

16. The method of claim 15, wherein said adding said predetermined dither signal comprises:

without changing said first bias voltage signal, adding a predetermined series of dither signals of different frequencies to said second bias voltage signal; and selecting for said predetermined dither signal a dither signal frequency for which an amplitude of a response to said series of dither signal on the at least one first sense electrode (S1) is maximal.

17. The method of claim 13, wherein said at least one of an amplitude and a phase of a response to said dither signal on the at least one first sense electrode is an amplitude of said response to said dither signal on the at least one first sense electrode (S1), and said first predetermined response value is a minimum value among the values of said amplitude of said response to said dither signal on the at least one first sense electrode when the first bias voltage signal varies along a predetermined value range.

18. The method of claim 17, wherein said predetermined value range includes at least one value of the first bias voltage signal previously used for a predetermined time.

19. The method of claim 13, wherein said at least one of an amplitude and a phase of a response to said dither signal on the at least one first sense electrode (S1) further comprises an amplitude and a phase of a response to said dither signal on the at least one second sense electrode (S2), and said first predetermined response value is a minimum value among the values of a combined amplitude of said response to said dither signal on the at least one first sense electrode (S1) and on the at least one second sense electrode (S2) when the first bias voltage signal varies along a predetermined value range.

20. The method of claim 13, wherein said adding a predetermined dither signal to said second bias voltage signal comprises: adding a predetermined series of dither signals of different frequencies to said second bias voltage signal; and said comparing at least one of an amplitude and a phase of a response to said dither signal on the at least one first sense electrode (S1) to a first predetermined response value comprises: comparing said at least one of an amplitude and a phase of a response to said dither signal on the at least one first sense electrode to a series of first predetermined response values corresponding to the responses to said predetermined series of dither signals of different frequencies when said difference between the first and second mode resonance frequencies has said predetermined minimal value.

* * * * *